(12) United States Patent
Mascarenhas (10) Patent No.: US 8,961,070 B1
(45) Date of Patent: Feb. 24, 2015

(54) SUBSEA PIPE CONNECTION SYSTEM AND PROCESS

(71) Applicant: Noel F. Mascarenhas, Houston, TX (US)

(72) Inventor: Noel F. Mascarenhas, Houston, TX (US)

(73) Assignee: Trendsetter Engineering, Inc., Houston, TX (US)

( * ) Notice: Subject to any disclaimer, the term of this patent is extended or adjusted under 35 U.S.C. 154(b) by 0 days.

(21) Appl. No.: 13/632,430

(22) Filed: Oct. 1, 2012

(51) Int. Cl.
 *E21B 43/013* (2006.01)
 *F16L 1/12* (2006.01)
(52) U.S. Cl.
 CPC ........................................ *F16L 1/12* (2013.01)
 USPC ........................................................ 405/170
(58) Field of Classification Search
 USPC ........... 405/128, 166, 169, 170, 184.4, 185.5;
  414/745.1, 745.4; 166/338, 343, 347,
  166/360
 See application file for complete search history.

(56) References Cited

U.S. PATENT DOCUMENTS

| | | | |
|---|---|---|---|
| 4,294,471 A | 10/1981 | van Bilderbeek | |
| RE31,265 E | 6/1983 | Sinclair et al. | |
| 4,708,376 A * | 11/1987 | Jennings et al. | 285/315 |
| 4,829,982 A * | 5/1989 | Abidor | 126/349 |
| 4,886,395 A | 12/1989 | Moles et al. | |
| 5,730,551 A | 3/1998 | Skeels et al. | |
| 6,142,708 A | 11/2000 | Tarlton et al. | |
| 6,481,504 B1 * | 11/2002 | Gatherar | 166/344 |
| 7,503,727 B2 * | 3/2009 | Ingebretsen et al. | 405/169 |
| 7,794,177 B2 | 9/2010 | DeLack | |
| 8,057,126 B2 | 11/2011 | Mogedal et al. | |
| 2009/0283277 A1 * | 11/2009 | Dallas | 166/379 |

* cited by examiner

*Primary Examiner* — Doug Hutton, Jr.
*Assistant Examiner* — Patrick Lambe
(74) *Attorney, Agent, or Firm* — Egbert Law Offices, PLLC (57) ABSTRACT

An apparatus for connecting a hub of a first pipe to a hub of a second pipe in a subsea environment includes a frame suitable for receiving the hub of the second pipe, a post extending outwardly of the frame, a landing structure slidably positioned on the post, and an actuator for moving the landing structure along the post such that the hub of the first pipe is juxtaposed against the hub of the second pipe. The landing structure includes a receptacle formed thereon. This receptacle is suitable for receiving a slotted portion of an arm extending from a trunnion extending around the first pipe such that the first pipe can pivot from a generally vertical orientation to a generally horizontal orientation. A clamp can extend against the hubs of the first and second pipes so as to join the pipes together.

14 Claims, 7 Drawing Sheets

SUBSEA PIPE CONNECTION SYSTEM AND PROCESS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the connection of pipes in a subsea environment. More particularly, the present invention the relates to stab-and-hinge techniques for moving pipes from a vertical orientation to a generally horizontal orientation. The present invention also relates to systems and processes whereby the hubs of respective pipes can be joined together and locked together without human intervention.

2. Description of Related Art Including Information Disclosed Under 37 CFR 1.97 and 37 CFR 1.98.

Pipes are often used to connect pieces of subsea oilfield equipment for fluid communication. These pipes are somewhat flexible armored hoses or pipes that can be provided with subsea matable connectors at either end. Typically, they are installed by be lowered into place from a pipe laying vessel. The final positioning and makeup of the end connectors is carried out by divers or by an remotely-operated vehicle (ROV). Short diver or ROV-installable hoses and pipes that are used to connect adjacent pieces of subsea equipment are known as jumpers.

Examples of subsea equipment that may be interconnected using such pipes or jumpers include subsea Christmas trees, manifolds and flow control or processing equipment located on the seabed, such as chokes, gas/water separators, pumps and gas liquification plants.

Where there are several different pieces of equipment to be interconnected, the installation of the pipes can be relatively time-consuming. An end of the pipe is generally lowered vertically toward the seabed from a pipe-laying vessel. The pipe is then laid out horizontally between the points to be interconnected. The pipe ends must then be retrieved from the seabed bed by a diver or an ROV. The end connectors are then aligned with the subsea equipment or with an adjacent pipe for make-up of the required fluid-tight connections.

In the past, various pieces of subsea equipment have generally vertical pipes extending therefrom. When the pipes are in a generally vertical orientation, a pipe can be lowered downwardly from the surface of the body of water so that the end can be aligned with the vertical pipe and joined thereto. The process of connection becomes much more complicated when it is desired to achieve a horizontal connection between the respective pipes and connectors. Typically, horizontal connections are very useful in those circumstances when there are height restrictions or other interferences to proper connections.

In the past, techniques have been provided for horizontally joining pipes in the subsea equipment. The equipment used to achieve such connections has been very complicated, expensive, and cumbersome. As such, a need has developed so as to provide a system which can be easily adapted for the connection of subsea pipes in the generally horizontal orientation. Additionally, there is a need so as to provide such equipment whereby the equipment can remain on the seabed after installation. As such, the relative cost associated with such apparatus should be relatively minimal.

In the past, various patents have issued relating to the connection of horizontal pipes. For example, U.S. Pat. No. 4,294,471, issued on Oct. 13, 1981 to van Bilderbeek, discloses a subsea flowline connector for connecting a horizontal flowline on a seabed to a vertical riser. A flowline flange on the end of the flowline is held in a preselected location while a rigid tubular spool piece is stroked into sealing relationship therewith. The spool piece is rigid and has horizontally and vertically extending portions. The spool piece is guided so that the entire spool piece moves with the stroking and the vertical stab with the riser is made after the sealing stroke is effected.

U.S. Reissue Pat. No. 31,265, reissued on Jun. 7, 1983 to Sinclair et al., provides a method and apparatus for making subsea pipe connections. A subsea pipeline hub is connected to the hub of an adjacent spool piece connected to an in-place manifold of a subsea structure that is used in the production of oil and/or gas. The pipeline hub is positioned relative to the opposing spool hub and a remotely-operated pipeline connecting tool is lowered from the water's surface to the subsea structure using guidelines and structural guidance for alignment of the pipeline hub with the spool piece hub. The spool piece hub is then drawn to the pipeline hub and the hubs are clamped together by operation of the connecting tool. Connecting tool operations are powered by hydraulic fluid and controlled from the surface. The pipeline hub may be lowered vertically and pivoted into its position adjacent the spool piece or may be pulled into that position.

U.S. Pat. No. 4,886,395 issued on Dec. 12, 1989 to Moles et al., teaches a pipeline-to-riser connection method and apparatus for remotely connecting an offshore structure to an underwater pipeline using an ROV. The structure has a bell-mouthed bending guide at its base through which a winch line from the surface passes and is temporarily looped back and attached to an accessible place on the structure. The pull-in line is attached to a terminal assembly at the end of flexible pipe attached to the pipeline. The terminal assembly is pulled in horizontally to the guide, arcuately through the guide, and then from the guide into general vertical alignment with a pipe end receiver assembly on the structure above the bending guide.

U.S. Pat. No. 5,730,551, issued on Mar. 24, 1998 to Skeels et al., provides a subsea connector system and method for coupling subsea conduits. This method utilizes a skid on the sea floor for coupling a subsea conduit carried by the skid to a subsea conduit on a relatively fixed subsea structure. A lift line device or structure has an upper lift line connected by a spreader bar to a pair of lower guide lines which are directed from a vertical position to a generally horizontal position by J-tubes. The ends of the guide lines have anchor members thereon which are anchored to guides on the subsea facility. Upon raising of the upper lift line, the skid moves in a combined pulling and lifting motion to engage a side of the subsea facility for being guided into a docked position with aligned guides on the subsea facility. In this position, an ROV secures the skid into a releasably locked position by insertion of retainer pins into aligned openings of the skid and subsea facility. The coupling on the end of flowline conduit is coupled onto an aligned conduit on the subsea facility.

U.S. Pat. No. 6,142,708, issued on Nov. 7, 2000 to Tarlton et al., provides a rotating porch for subsea branch and termination pipeline connections. A landing platform and swivel connection hub are attached to a pipeline branch, termination, or manifold. The landing platform is mounted so that it may be rotated about the connection hub. This permits the installation of the subsea connection on a near level platform and allows the pipeline to be laid subsea with greater roll angles than would be acceptable otherwise. The elevation of the platform is adjusted by an ROV and locked into place once the adjustment is completed.

U.S. Pat. No. 6,481,504, issued on Nov. 19, 2002 to N. Gatherar, shows a flowline connector with a subsea equipment package. The flowline connector has a first connector portion for mounting on a first piece of subsea equipment. A second connector portion of the flowline connector is attached to an end portion of a flowline. Each connector portion has a respective guide interengageable by lowering the second connector portion, on the end portion of the flowline, into the first connector portion. The guides allow the second connector portion to pivot relative to the first connector portion to bring the first connector portion and the second connector portion into axial alignment for make-up of a fluid-tight connection therebetween.

U.S. Pat. No. 7,794,177, issued on Sep. 14, 2010 to K. DeLack, discloses a subsea system for securing an end portion of a pipeline. A subsea foundation has a lower portion located below the sea floor and an upper portion extending above the sea floor. The subsea foundation has a receptacle formed in the upper portion. The system includes a base frame that lands on the subsea foundation. The base frame has a track formed therein. A stab is hingedly mounted to the base frame. The stab stabs into the receptacle to secure the base frame to the subsea foundation. A sliding mechanism is carried by the base frame and moves along the track. The sliding mechanism is connected to a segment of the pipeline extending along the sea floor.

U.S. Pat. No. 8,057,126, issued on Nov. 15, 2011 to Mogedal et al., provides a connector means for tie-in and connecting of a first pipeline and a second pipeline. The connector means includes a first connector part retaining a first end of the first pipeline. The first connector part and the first pipeline are designed to be lowered and deployed on the seabed in advance of the connecting operation. A submersible second connector part that retains a second end of the second pipeline is also included. The second connector part and the second pipeline are designed to be lowered from the surface of the water toward the first connector part. The connector parts include means that cooperate during relative motion between the connector parts. The second connector part is hingedly tiled by means of forced motion. This aligns the second pipe end in the direction toward the first pipe end such that the first and second pipelines are brought to be in line with each other on the seabed.

It is an object of the present invention to provide a subsea pipe connection system which effectively establishes horizontal connections between pipes.

It is another object of the present invention to provide a subsea pipe connection system that avoids height restrictions that would affect vertical pipes.

It is another object of the present invention to provide a subsea pipe connection system which is allows the pipes to be relatively easily connected.

It is another object of the present invention to provide a subsea pipe connection system which is extremely reliable.

It is a further object of the present invention to provide a subsea pipe connection system which allows certain components to remain on the seabed following the connection of the pipes to one another.

These and other objects and advantages of the present invention will become apparent from a reading of the attached specification and appended claims.

BRIEF SUMMARY OF THE INVENTION

The present invention is an apparatus for connecting a hub of a first pipe to a hub of a second pipe. The apparatus comprises a frame suitable for receiving the hub of the second pipe, a post extending outwardly of the frame, a landing structure slidably positioned on the post, and a means for moving the landing structure along the post such that the hub of the first pipe is juxtaposed against the hub of the second pipe. The landing structure has a receptacle formed thereon. This receptacle is suitable for receiving a portion of the first pipe therein such that the first pipe can pivot thereabout.

The frame has a clamp in a position suitable for extending against the hub of the second pipe. The apparatus of the present invention further includes a means for tightening the clamp against the first and second pipes when the first and second pipes are juxtaposed together. This means for tightening includes a bucket extending outwardly of the frame and a shaft positioned in the bucket and cooperative with the clamp. The shaft is suitable for rotation by a torque tool of an ROV.

The landing structure includes a first guide having a slot formed therein, and a second guide having a slot formed therein. The first guide is in spaced parallel relation to the second guide. Each of the slots of the first and second guides open at a top of the first and second guides. Each of the slots of the first and second guides are V-shaped slots with a wide end opening at a top of the guides. Each of the slots of the first and second guides has a J-lock formed at a bottom thereof. A portion of the first pipe is rotatably received in the J-lock. The receptacle of the landing structure includes a first receptacle and a second receptacle. A first porch extends away from the first receptacle and a second porch extends away from the second receptacle. The landing structure has a channel formed between the first and second porches. This channel is suitable for receiving the first pipe therein.

The frame has at least one slotted member affixed thereto. The means for moving includes a hydraulic actuator having one end affixed to the landing structure and an opposite end received in the slotted member. The slotted member further can include a first slotted member and a second slotted member positioned in spaced relation to each other. The hydraulic actuator can include a first hydraulic actuator having one end interconnected to the landing structure and an opposite end received in the first slotted member. The hydraulic actuator can further include a second hydraulic actuator having one end interconnected to the landing structure and an opposite end received in the second slotted member.

A trunnion is suitable for affixing to the first pipe. This trunnion has a first arm and a second arm extending radially outwardly therefrom. At least one of the first and second arms is received in the receptacle of the landing structure. In particular, the first arm has a first notch and a second notch formed thereon. The second arm also has a first notch and a second notch formed thereon. The first notches are suitable for engaging with the first and second receptacles of the landing structure. Each of the first and second hydraulic actuators includes a slotted member extending therefrom. These slotted members are suitable for engaging with the second notches of the first and second arms.

The present invention is also a process for connecting a hub of a first pipe to a hub of a second pipe in the subsea equipment. In particular, this process includes the steps of: (1) lowering the first pipe toward the landing structure; (2) engaging the arm of the first pipe with the receptacle of the landing structure; (3) rotating the first pipe from a generally vertical orientation to a generally horizontal orientation such that the hub of the first pipe faces the hub of the second pipe; (4) moving the landing structure toward the frame until the hub of the first pipe is juxtaposed against the hub of the second pipe; and (5) clamping the hubs of the first and second pipes together.

In this process of the present invention, the step of moving includes connecting a hydraulic actuator to the landing structure and to the frame. The hydraulic actuator is actuated so as to draw the landing structure toward the frame. The step of clamping includes positioning a clamp in the frame such that the clamp has a shaft extending therefrom. The shaft is rotated by an ROV so as to close the clamp against the hubs of the first and second pipes.

This foregoing section is intended to describe, with particularity, the preferred embodiment of the present invention. It is understood that variations in this preferred embodiment of the present invention can be made within the scope of the present invention. As such, this section should not to be construed, in any way, as limiting of the broad scope of the present invention. The present invention should only be limited by the following claims and their legal equivalents.

DETAILED DESCRIPTION OF THE INVENTION

Figure 1:
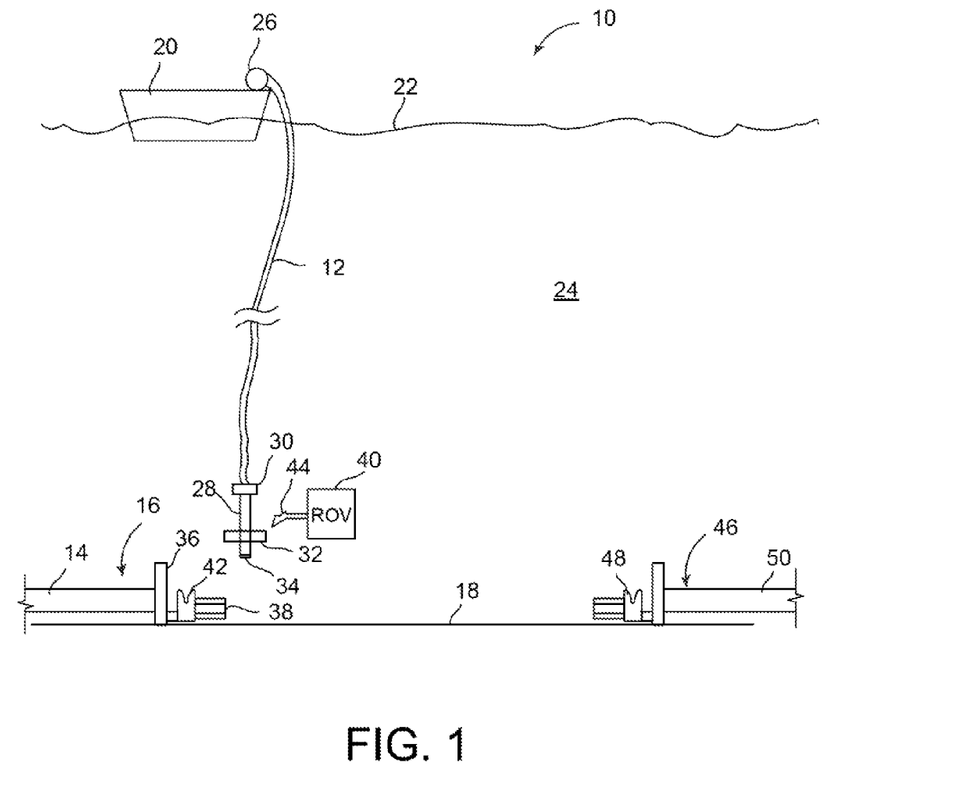
FIG. 1 is an illustration showing the system and process for the connection of pipes in the subsea equipment.

Referring to FIG. 1, there is shown the process 10 for the installation of a pipe in a subsea equipment such that a first pipe 12 can be connected to a second pipe 14. In FIG. 1, it can be seen that the pipeline connection system 16 is located adjacent to the seabed 18. The first pipe 12 is lowered from a pipe-laying vessel 20 located on the surface 22 of a body of water 24. The pipe-laying vessel 20 includes a reel 26 thereon which allows the first pipe 12 to be lowered downwardly into the body of water 24.

The first pipe 12 includes a generally rigid portion 28 at an end thereof. A GRAYLOCK™ or TEKLOCK™ API flange 30 will connect the rigid portion 28 to the first pipe 12 in a conventional manner. As such, the rigid portion 28 will be in sealed relationship with the first pipe 12. The first pipe 12 can be a generally rigid pipe or an armored flexible pipe. A trunnion 32 is rotatably mounted adjacent to the hub 34 located at the end of the first pipe 12. The trunnion 32 is illustrated as having arms extending outwardly therefrom.

The pipeline connection system 16 is illustrated as having the second pipe 14 connected to a frame 36. A landing structure 38 extends outwardly from the frame 34. As will be described hereinafter, the landing structure 38 will be translatable relative to the frame 36.

Initially, as can be seen in FIG. 1, the first pipe 12 is lowered into the body of water 24 so that the hub 34 on the rigid portion 28 generally approaches the seabed 18. Ultimately, an ROV 40 can be utilized so as to manipulate the rigid portion 28 in a direction toward the receptacle 42 associated with the landing structure 38. When the arms associated with the trunnion 32 are aligned with the receptacle 42, the first pipe 12 can be further lowered from the reel 26 on the pipe-laying vessel 20 so as to engage within the receptacle 42. The ROV 40 can also be utilized so as to utilize a suitable torque tool 44 so as to manipulate a shaft associated with a clamp so as to secure the hub 34 to a hub associated with second pipe 14.

Another subsea pipe connection system 46 is positioned on the seabed 18 in spaced relationship to the subsea pipe connection system 16. The subsea pipe connection system 46 will have a similar configuration of that to the pipeline connection system 16. Ultimately, the rigid portion 28, the trunnion 32 and the hub 34 can also be provided on the opposite end of the first pipe 12 so that the pipe-laying vessel 20 can manipulate the opposite end of the first pipe 12 so that it is also received within the receptacle 48 of the pipe connection system 46. As such, the pipe 12 can fully extend horizontally in fluid communication between the second pipe 14 and the third pipe 50.

Figure 2:
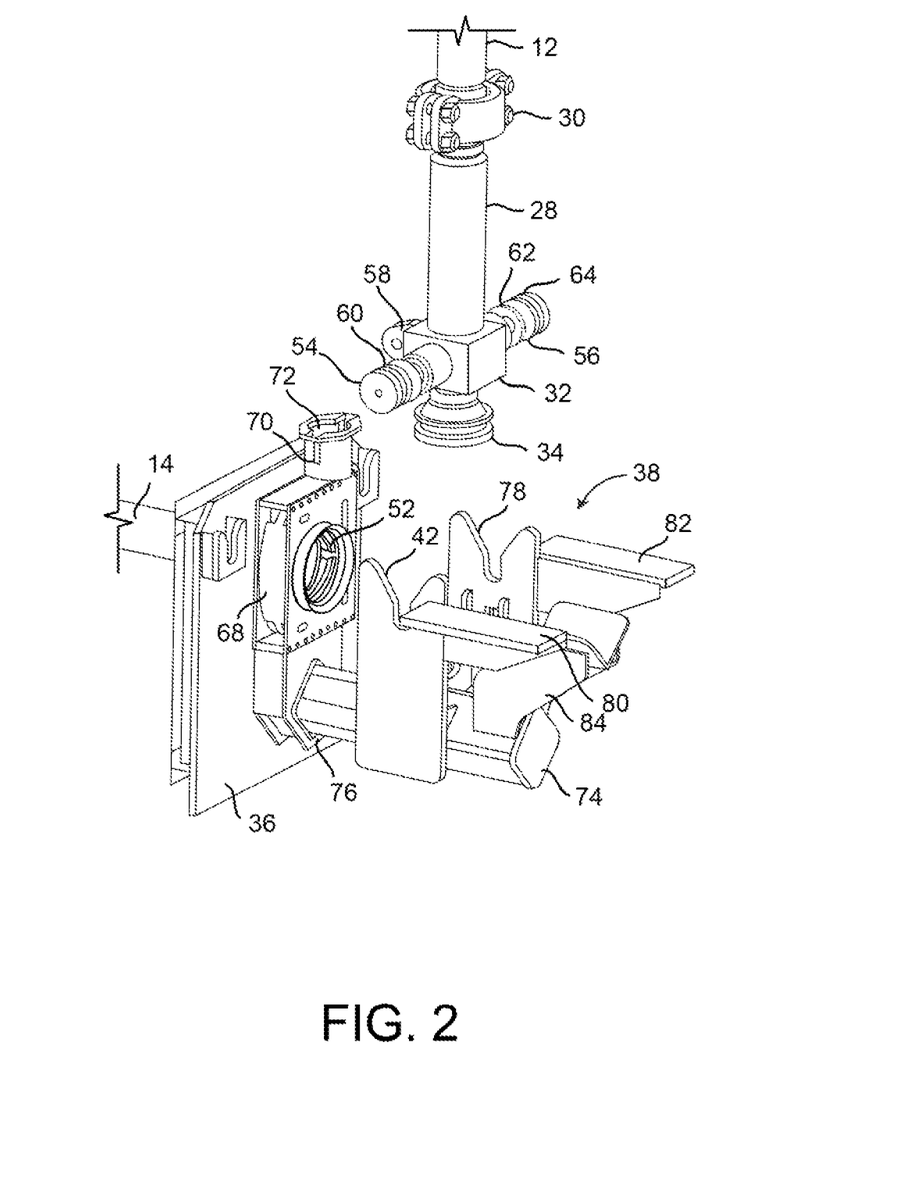
FIG. 2 shows a perspective view of an initial step in the process of the present invention for the pipeline connection system of the present invention.

FIG. 2 is a detailed view showing the manner in which the first pipe 12 can be connected in fluid-tight relationship with a hub 52 associated with the second pipe 14. Initially, it can be seen that the first pipe 12 has the flange connection 30 affixed thereto. The rigid portion 28 extends from the this flange connection. Ultimately, the hub 34 will be located at the end of the first pipe 12. The trunnion 32 is illustrated as having a first arm 54 and a second arm 56 extending outwardly therefrom. The first arm 54 includes a first notch 58 and a second notch 60 formed circumferentially therearound. Similarly, the second arm 56 includes a first notch 62 and a second notch 64 extending circumferentially therearound. The trunnion 32 is configured so as to be rotatable around the rigid portion 28.

In FIG. 2, it can be see that the frame 36 is in the nature of a panel which is affixed to the hub 52 of the second pipe 14. The frame 36 includes a housing which will extend around he hub 52. A suitable clamp 68 is positioned within the housing so as to be in a position for engaging with a surface of the hub 52 of the second pipe 14 and also with the surface of the hub 34 associated with the first pipe 12. The housing includes a bucket 70 that extends upwardly therefrom. A shaft 72 is cooperative with the clamp 68. The shaft 72 will extend into the interior of the bucket 70. The bucket 70 is configured so as to allow the torque tool 44 of the ROV 40 to be inserted therein such that the torque tool 44 can engage with the shaft 72 so as to provide a rotational force to the shaft 72 and, thereby, tighten the clamp. The frame 36 can be lowered in the water and positioned such that the hub of the second pipe 14 resides within an interior of the clamp 68.

A post 74 is affixed to the frame 36 and is received within an opening 76 associated with the housing 66. The post 74 is loosely fitted within the opening 76 of the housing 66 so as to allow slight movement therebetween.

The landing structure 38 includes a first receptacle 42 and a second receptacle 78. Each of the receptacles 42 and 78 includes a V-shaped slot with a wide end that opens at the top end of the receptacle. A J-lock is formed at the bottom of the slots of the receptacles 42 and 78. A first porch 80 is formed on the landing structure 38. Similarly, a second porch 82 is formed on the landing structure 38. The first porch 80 will extend away from the receptacle 42. Similarly, the second porch 82 will extend away from the receptacle 78. A suitable support frame 84 will extend between the post 74 and the porches 80 and 82 so as to provide structural integrity to the landing structure 38.

Figure 3:
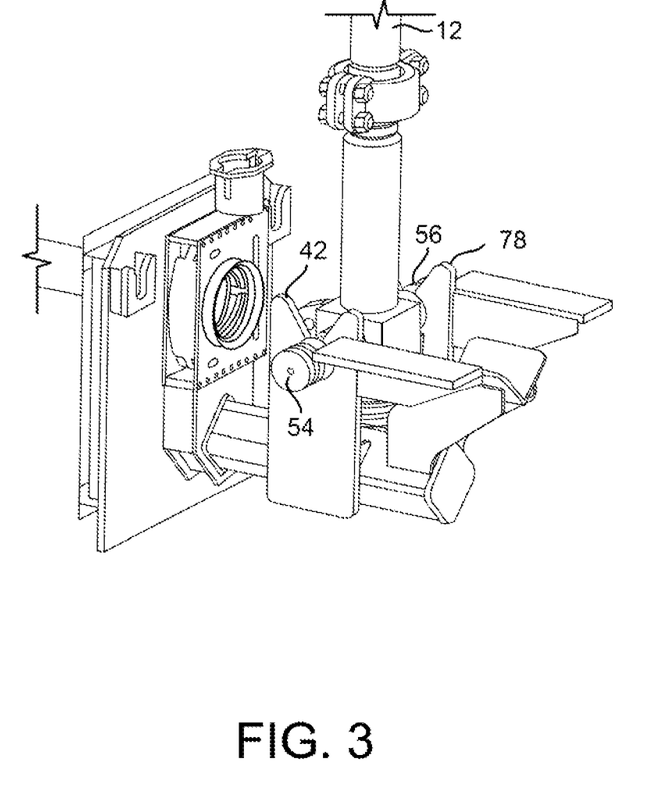
FIG. 3 is a perspective view showing a further step in the connection of pipes in accordance with the pipeline connection system of the present invention.

FIG. 3 illustrates that the first pipe 12 has been lowered and manipulated by the ROV 40 such that the first arm 54 and the second arm 56 are received in the respective receptacles 42 and 78. In particular, the first notch 58 of the first arm 54 is received within the receptacle 42. Similarly, the first notch 62 of the second arm 56 is received within the receptacle 78. As such, a tight fit is achieved between the arms 54 and 56 and the receptacles 72 and 48. The pipe 12 will extend upwardly in a generally vertical orientation. In this position, the hub 34 of the first pipe 12 will be facing downwardly.

Figure 4:
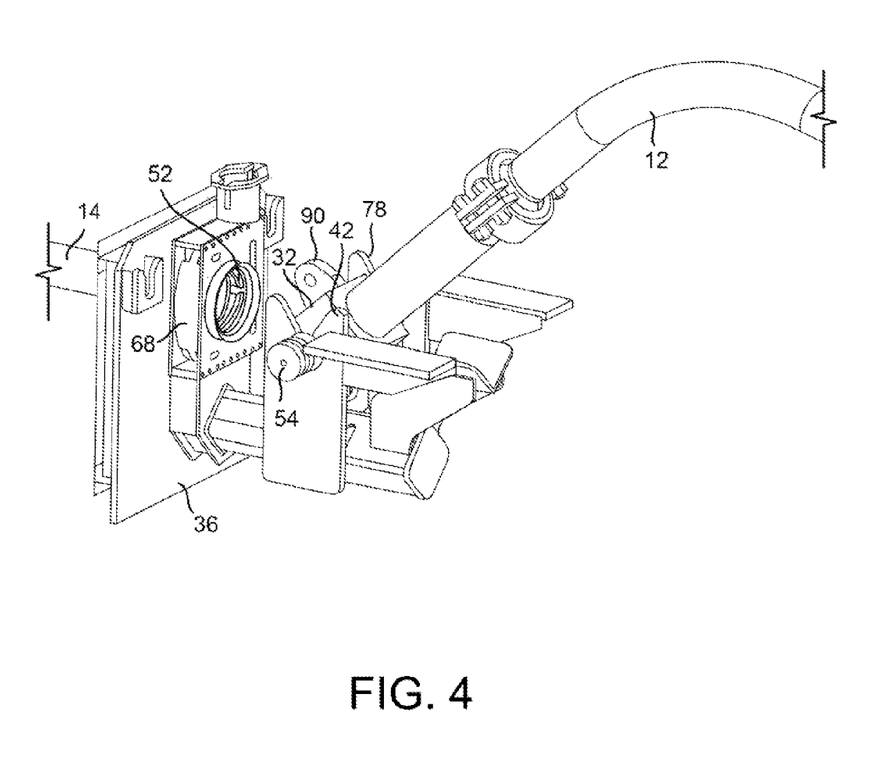
FIG. 4 is a further perspective view showing the process of connecting the pipes in the subsea equipment in accordance with the subsea pipe connection system of the present invention.

In FIG. 4, it can be seen that the first pipe 12 is tilted in a direction away from the frame 36. Typically, this angled orientation is achieved by moving the pipe-laying vessel 20 in a direction away from the second pipe 14. In this arrangement, the first arm 54 will rotate within the first receptacle 42. Similarly, the second arm 56 will rotate within the second receptacle 78. A suitable lug 90 is also affixed to the trunnion 32 so as to facilitate the manipulation and location of the trunnion 32 and arms 54 and 56. In FIG. 4, the hub 34 associated with the first pipe 12 is being tilted in a direction so as to face the hub 52 associated with the second pipe 14.

Figure 5:
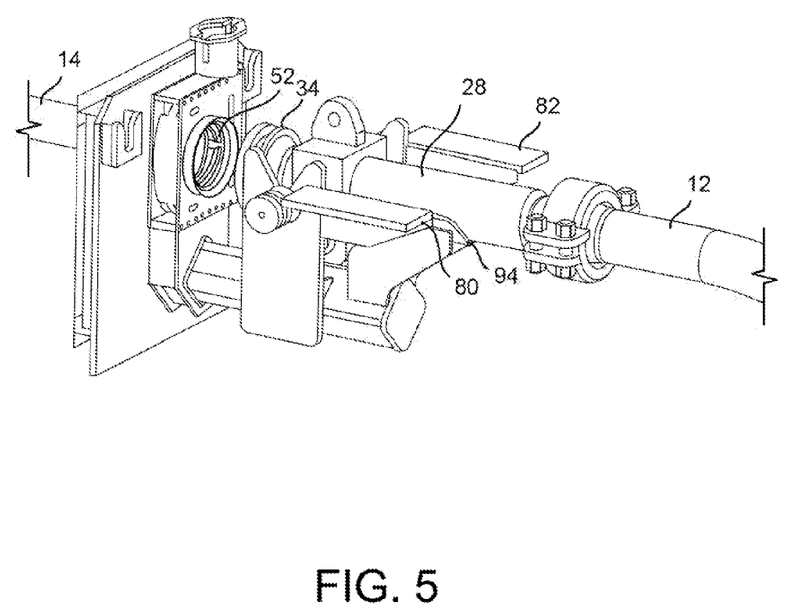
FIG. 5 is a further perspective view showing a later step associated with the connections of pipes in accordance with the subsea pipe connection system of the present invention.

In FIG. 5, the first pipe 12 has been lowered so as to be in a generally horizontal orientation. In particular, the rigid portion 28 of the first pipe 12 is positioned within the channel 94 that is located between the first porch 80 and the second porch 82. In this orientation, the hub 34 will be facing the hub 52 associated with the second pipe 14.

Figure 6:
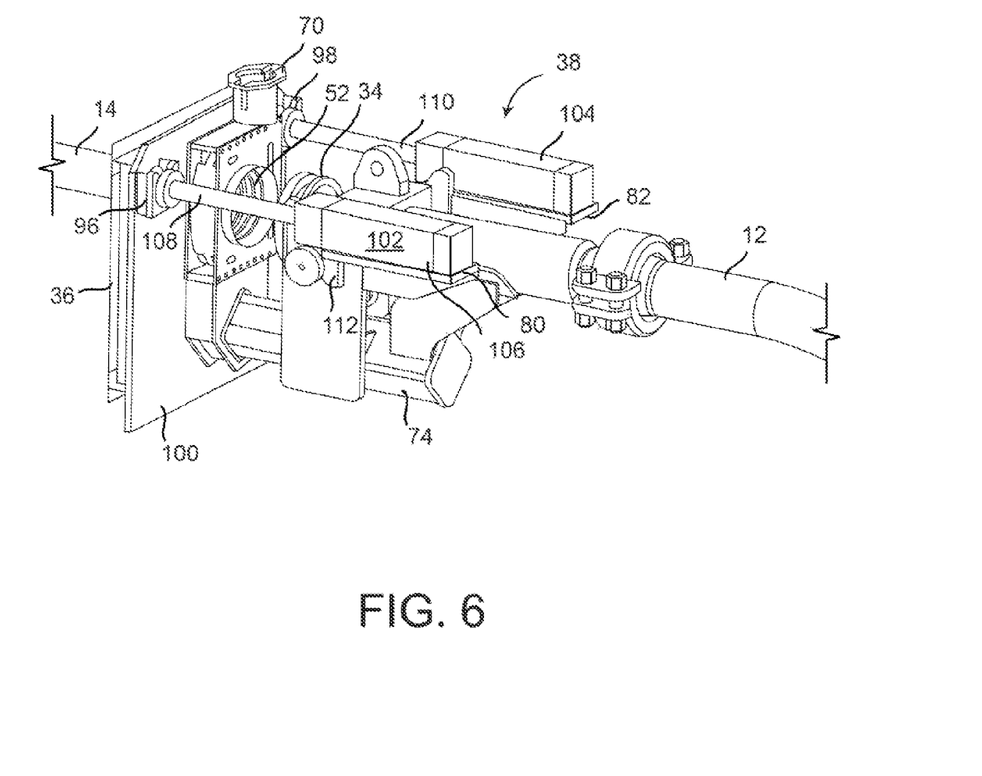
FIG. 6 is a further perspective view showing the installation of the pipes in accordance with the pipeline connection system of the present invention.

In FIG. 6, it can be seen that there is a first slotted member 96 and a second slotted member 98 that are affixed to a surface 100 of frame 36. The slotted members 96 and 98 are arranged so as to receive an end of a first hydraulic actuator 102 and a second hydraulic actuator 104, respectively, therein. As can be seen, the first hydraulic actuator 102 has a cylinder 106 that is affixed to the first porch 80. The piston rod 108 extends so as to have an end received by the slotted member 96. Similarly, the second hydraulic actuator 104 is positioned on the second porch 82. The piston rod 110 of the second hydraulic actuator 104 will be received within the second slotted member 98.

In FIG. 6, it can be seen that the first hydraulic actuator 102 has a slotted member 112 extending downwardly therefrom. This slotted member 112 will be received by the second notch 60 of the arm 54. A similar slotted member associated with the second hydraulic actuator 104 will be received by the second notch 64 of the second arm 56 of the trunnion 32. As a result, the hydraulic actuators 102 and 104 will merely rest upon the respective porches 80 and 82. All of the force that will be transmitted will be imparted onto the arms 54 and 56 associated with the trunnion 32. Each of the hydraulic actuators 102 and 104 can be easily installed and manipulated by the ROV 40 so as to achieve the positioning shown in FIG. 6. Various other "means for moving" can be used within the concept of the present invention, such as mechanical mechanisms, pneumatic actuators, linkages and levers, and other mechanical items that are motor-driven.

In order to achieve the proper positioning of the hub 34 of the first pipe 12 with the hub 52 of the second pipe 14, the hydraulic actuators 102 and 104 are actuated such that the landing structure 38 is drawn toward the frame 36. Ultimately, the end of the hub 34 will be juxtaposed against the hub 52. Once the juxtaposition has occurred, the torque tool 44 of the ROV 40 can be directed toward the bucket 70 and onto the shaft associated with the clamp 68 so as to lock the hub 34 against the hub 52. As a result, a fluid-tight connection will be achieved. During this action of movement of the landing structure 38 toward the frame 36, the landing structure 38 will slide along the post 74 in a controlled direction. As such, proper alignment of the hubs 34 and 52 will be easily achieved.

Figure 7:
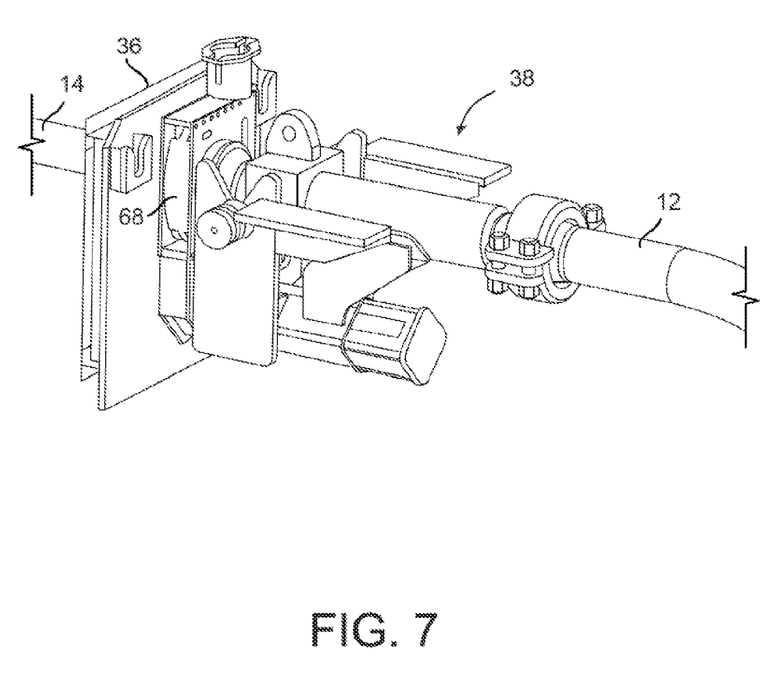
FIG. 7 is a perspective view of the pipeline connection system of the present invention in which the first pipe and the second pipe are connected together.

FIG. 7 shows the final locking arrangement between the hubs of the first pipe 12 and the second pipe 14. The clamp 68 is locked so as to exert proper forces against the respective hubs so as to lock the hubs in place. The hydraulic actuators 102 and 104 have been removed and can be used at another location. Ultimately, the landing structure 38 and the frame 36 will remain in place on the seabed 18 as long as the first pipe 12 is connected the second pipe 14. A similar procedure, as described above, can be utilized so as to connect the opposite end of the first pipe 12 to the third pipe 50 (as shown in FIG. 1).

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for connecting a hub of a first pipe to a hub of a second pipe, the apparatus comprising:
    a frame suitable for receiving a hub of the second pipe, said frame having a first slotted member and a second slotted member affixed on one side thereof in spaced relation to each other;
    a post extending horizontally outwardly of said frame;
    a landing structure slidably positioned on said post, said landing structure having a receptacle formed thereon, said receptacle suitable for receiving a portion of the first pipe therein such that the first pipe can pivot thereabout, said landing structure comprising:
    a channel:
    a first porch positioned on one side of said channel and extending in a horizontal plane away from said channel; and
    a second porch positioned on an opposite side of said channel and extending in a horizontal plane away from said channel;
    a first hydraulic actuator having one end slidably and releasably received in said first slotted member and an opposite end supported on a top of said first porch, said first hydraulic actuator suitable for connection to the first pipe; and
    a second hydraulic actuator having one end removably slidably and releasably received in said second slotted member and an opposite end supported on a top of said second porch, said hydraulic actuator suitable for connection to the first pipe, said first and second hydraulic actuators cooperative with said landing structure so as to move said landing structure along said post to a position such that the hub of the first pipe is juxtaposed against the hub of the second pipe.

2. The apparatus of claim 1, said frame having a clamp in a position suitable for extending around the hub of the second pipe, the apparatus further comprising:
a means for tightening said clamp around the first and second pipes when the first and second pipes are juxtaposed against together.

3. The apparatus claim 2, said means for tightening comprising:
a bucket extending outwardly of said frame; and
a shaft positioned in said bucket and cooperative with said clamp, said shaft suitable for rotation by a torque tool of a remotely-operated vehicle.

4. The apparatus claim 1, said receptacle of said landing structure comprising:
a first receptacle having a slot formed therein; and
a second receptacle having a slot formed therein, each of the slots of said first and second receptacles opening at a top of said first and second receptacles.

5. The apparatus claim 4, each of the slots of said first and second receptacles being a V-shaped slot with a wide end opening at a top of said first and second receptacles.

6. The apparatus of claim 5, each of the slots of said first and second receptacles having a J-lock formed at a bottom thereof, the portion of the first pipe being rotatably received in the J-lock.

7. The apparatus claim 1, further comprising:
a trunnion suitable for affixing to the first pipe, said trunnion having a first arm and a second arm extending radially outwardly therefrom, at least one of said first and second arms being received in said receptacle of said landing structure.

8. A subsea pipe connection system comprising:
a first pipe having at least one arm extending radially outwardly therefrom, the arm having a first notch and a second notch extending therearound, said first notch being in spaced relation to said second notch;
a frame having at least one slotted member affixed thereto;
a second pipe positioned in said frame, said second pipe having a hub at an end thereof, said hub of said second pipe positioned adjacent a surface of said frame;
a post extending horizontally outwardly of said frame;
a landing structure slidably positioned on said post, said landing structure having at least one receptacle formed thereon, said first notch of said arm of said first pipe received in said receptacle of said landing structure; and
a hydraulic actuator having one end slidably and releasably received in the slotted member, said hydraulic actuator engaged with said second notch of said arm, said hydraulic actuator having an opposite end supported on a top of said landing structure.

9. The subsea pipe connection system of claim 8, said receptacle comprising a first receptacle and a second receptacle positioned in spaced relation to each other, each of said first and second receptacles having a V-shaped slot.

10. The subsea pipe connection system of claim 8, said at least one arm affixed to a trunnion extending around said first pipe and extending outwardly transverse to a longitudinal axis of said first pipe.

11. The subsea pipe connection system of claim 8, said frame having a clamp in a position suitable for extending around said hub of the second pipe, the subsea pipe connection system further comprising:
a means for tightening said clamp against the hubs of said first and second pipes when said first and second pipes are juxtaposed together.

12. A process for connecting a hub of a first pipe to a hub of a second pipe in which the hub of the second pipe is positioned in a frame and in which a landing structure is translatably mounted to a horizontal post, the first pipe having an arm extending radially outwardly therefrom, the arm having a first notch and a second notch thereon in spaced relation to each other, the landing structure having a receptacle facing upwardly therefrom, the process comprising:
lowering the first pipe toward the landing structure;
slidably engaging the first notch of the arm of the first pipe with the receptacle of the landing structure;
rotating the first pipe from a generally vertical orientation to a generally horizontal orientation, the hub of the first pipe facing the hub of the second pipe in the horizontal orientation;
connecting a hydraulic actuator to the second notch of the arm and to the frame; and
actuating the hydraulic actuator so as to draw the landing structure along the horizontal post toward the frame such that an end of said hydraulic actuator resides on a top of said landing structure;
moving the landing structure toward the frame until the hub to of the first pipe is juxtaposed against the hub to the second pipe; and
clamping the hubs of the first and second pipes together.

13. The process of claim 12, the step of clamping comprising:
positioning a clamp in said frame, said clamp having a shaft extending therefrom; and
rotating said shaft so as to close said clamp against the hubs of the first and second pipes.

14. The process of claim 12, the arm comprising a first arm extending outwardly on one side of the first pipe and a second arm extending outwardly of an opposite side of the first pipe, the first arm having a the first notch thereon, the second arm having another first notch thereon, each of the first and second arms having a notch formed thereon, the receptacle having a first receptacle and a second receptacle arranged in spaced parallel relationship, the step of engaging comprising:
engaging the first notch of the first arm within the first receptacle;
engaging the another first notch of the second arm within the second receptacle; and
locking the first notches of the first and second arms in the respective first and second receptacles.

* * * * *